Nov. 26, 1946.　　　　　G. L. DIMMICK　　　　　2,411,715
APPARATUS FOR THE PRODUCTION OF REFLECTION REDUCING COATINGS
Filed Dec. 14, 1942

Inventor
Glenn L. Dimmick
By C. D. Tuska
Attorney

Patented Nov. 26, 1946

2,411,715

UNITED STATES PATENT OFFICE 2,411,715

APPARATUS FOR THE PRODUCTION OF REFLECTION REDUCING COATINGS

Glenn L. Dimmick, Indianapolis, Ind., assignor to Radio Corporation of America, a corporation of Delaware Application December 14, 1942, Serial No. 468,915

3 Claims. (Cl. 91—12.2)

This invention relates to an apparatus for producing evaporated coatings such, for example, as reflection reducing coatings or coatings of evaporated metal on optical elements. The production of evaporated reflection reducing coatings is described, for example, in Cartwright et al. Patent No. 2,207,656. In the actual production of such coatings many difficulties are encountered. One of the difficulties is due to the fact that the coating material when evaporated in vacuum either from a coiled filament or from an evaporating boat travels uniformly in all directions like radiant energy. As a consequence, the quantity of coating material reaching a given area of surface varies approximately inversely as the square of the distance of the surface from the evaporator. The present invention provides an apparatus for rendering the coating thickness approximately uniform over a plane surface of considerable area.

One object of the invention is to provide an improved evaporating apparatus for the evaporation of thin films.

Another object of the invention is to provide the evaporating apparatus which will compensate for the normal irregularity in distribution of evaporated material.

Other and incidental objects of the invention will be apparent to those skilled in the art from a reading of the following specification and an inspection of the accompanying drawing in which.

When a material is evaporated from a small boat or coil placed in a vacuum, the evaporated particles travel in straight lines very much like light rays from a luminous source. This condition would result in an evaporated film of uniform thickness upon a spherical surface with the boat or coil at its center. In practice it is very desirable to arrange the evaporating system so that a coating of uniform thickness can be deposited on a flat surface. In his book "Procedures in Experimental Physics" (page 179), Dr. John Strong shows how to obtain this condition by placing a large number of evaporators in a circle whose radius is equal to the distance from the evaporators to the flat object being coated. This has many practical objections. First it assumes a large number of evaporators with identical characteristics and which will vaporize exactly the same amount of material when heated with the same current. This is difficult to realize in practice.

Figure 1:
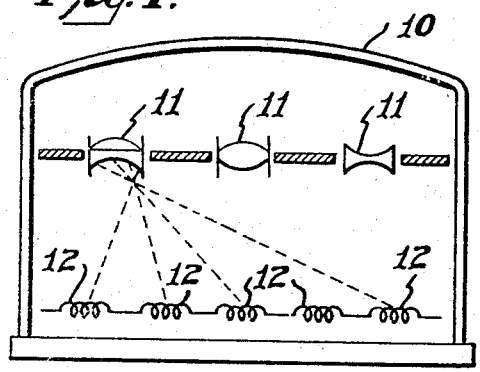
Figure 1 shows one way in which it has heretofore been attempted to secure uniform coatings on optical surfaces.

In a lens coating equipment, it is desirable to coat several lenses at one time and these are often in tubular mountings so that they can receive the vaporized material from only a limited angle. Fig. 1 shows why those lenses which are in deep mountings could not receive the same quantity of evaporated material on all portions of the lens surface. It will be apparent from this figure that the material from the evaporating coil 12 will be obstructed by the mountings of the lenses 11 so that a uniform coating will not be produced.

Figure 2:
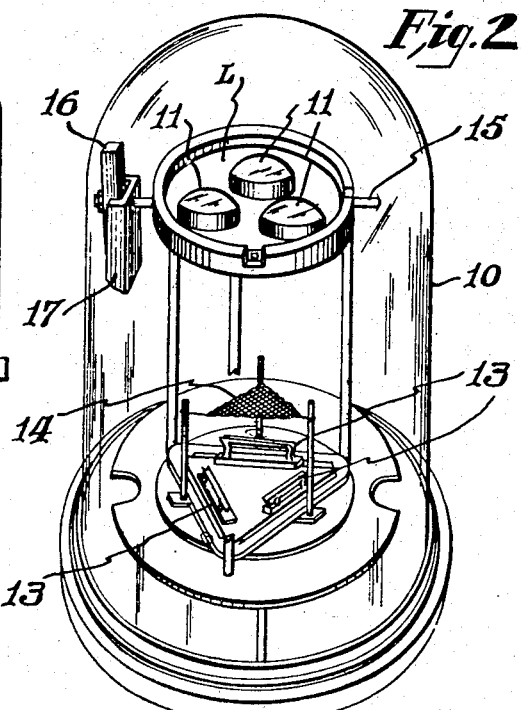
Figure 2 is a perspective view of my improved evaporating apparatus.

The improved apparatus according to the present invention as shown in Fig. 2 produces much more uniform coatings on flat surfaces and on lenses in deep mountings. In the arrangement illustrated, three evaporating boats are placed in a triangular arrangement and a triangular wire screen is placed at the proper distance above the boats. This screen obstructs a portion of the evaporated material and permits the rest to reach the lens plate or holder L carrying the lenses 11 in the upper end of the bell jar 10. The evaporating boats 13 are made of platinum or other appropriate material and are heated by electric currents passed through them. The bell jar 10 is of course air tight and is evacuated to an appropriate degree before the commencement of evaporation.

Figure 3:
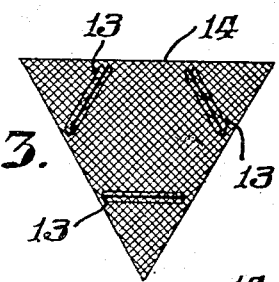
Figure 3 is a top view of the evaporators and screen from the center of the lens holder.
Figures 4, 7:
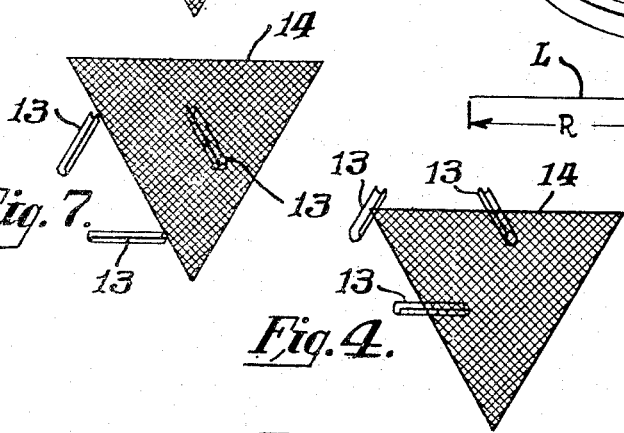
Figure 4 is a view of the evaporators and screen taken from the outside edge of the lens holder on a radius whose vertical projection passes through an apex of the screen 14.
Figure 7 is a view of the evaporators and screen when viewed from the edge of the lens holder on a radius whose vertical projection passes through the center of any side of screen 14.

As viewed from the center of the lens plate, that is, from the plane of the lenses at a point on the common axis passing through the centers of the evaporator assembly, the screen and the lens plate, the screen 14 and the evaporators 13 appear as shown in Fig. 3. It will be apparent that at this point, which is the nearest to the evaporators, all of the evaporators are shielded by the screen and only such evaporated material can reach the surface as passes through the screen. As the viewpoint recedes from the center of the lens plate, the area of the evaporating boats to which the surface is directly exposed increases until, at the edge of the circular lens holder the equivalent of two evaporating boats are completely exposed. Figure 4 shows the relation between the boats and screen as viewed from the edge of the lens holder on a radius whose vertical projection intersects any one of the apices of the screen. In this case one boat is completely uncovered and two boats are each half uncovered. Figure 7 is a similar illustration of the view from the edge of the lens holder on a radius whose vertical projection passes through the center of any side of the screen. In this case, one boat is completely covered, and the other two are each fully exposed, producing, as before, the same total exposed area. At any other point on the edge of the circular lens holder, the equivalent of two boats are uncovered. Furthermore, the compensation is constant for all points on any circle with its center on the common axis passing through the center of the lens holder, screen and boat assembly, and proportional to the radius of the circle from which the view is taken. Consequently, the evaporation is substantially constant over the whole area within the limits of the lens holder.

Figure 5:
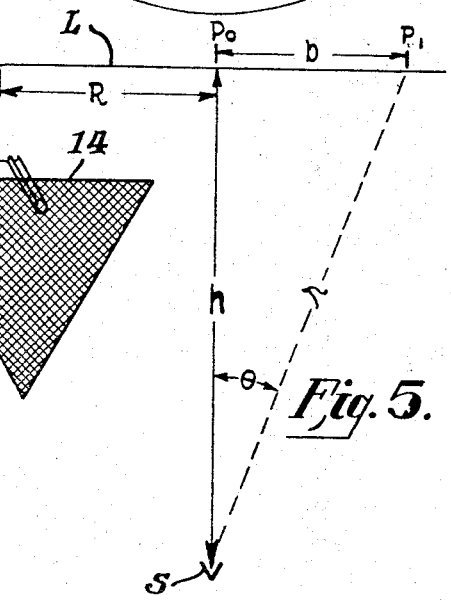
Figure 5 is a diagram illustrating the relation between lens distance and coating thicknesses.

In Fig. 5 there is diagrammatically illustrated an evaporating source S placed at a distance $h$ below the lens plate L having a radius R. If $b$ is the radius of a point $P_1$ on the lens plate, the thickness of the evaporated film at this point is $$T_1 = T_0 \frac{h^2 \cos^2}{r^2} \theta = T \cos^4 \theta$$

where $T_0$ is the corresponding thickness at point $P_0$.

Figure 6:
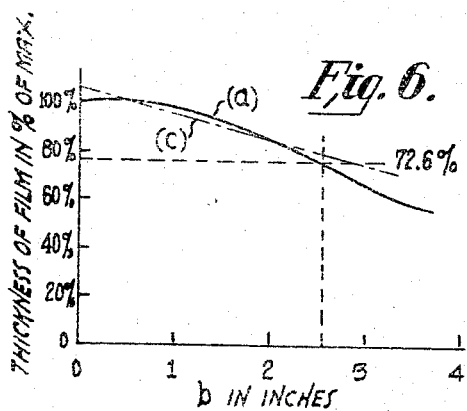
Figure 6 is a curve showing the corrected results secured by the use of my improved apparatus.

Fig. 6 shows how the film thickness decreases as the distance $b$ (from the center of the plate) is increased.

As an example, if we make $h=6''$ and $R=2\frac{1}{2}''$ then the film thickness at the edge of the plate would be 72.6 percent of the thickness at the center.

The method of compensation described above is linear with $b$ (Fig. 5) but the attenuation in film thickness is not linear.

Curve (a) (Fig. 6) shows the actual attenuation while line (c) shows a close approximation to this. Since only two of the boats are uncovered when viewed from the edge of the plate as shown in Figs. 4 or 7, the transmission of the compensating screen would have to be $72.6 \times 66.6 = 48\frac{1}{2}$ percent. A triangular piece of No. 40 mesh brass screen may be used for this purpose. Its size was determined from the arrangement shown in Fig. 2, the size of the screen being determined from the diameter of the lens plate and the position of the boats indicated in Fig. 2.

It will be apparent to those skilled in the art that my invention is not limited to the use of evaporating boats but that the same general arrangement may be used with other types of evaporators such as wire helices, straight wire filaments or the like.

In Fig. 2, the lenses 11 are supported on an appropriate lens plate L which is mounted on a shaft 15. This shaft carries on its opposite end an appropriately shaped piece of magnetic material 16 counterbalanced by a member 17, preferably of non-magnetic material. After the optical elements 11 have been appropriately coated on one side, the lens plate L is rotated with the shaft 15 by manipulation of a magnet outside of the bell jar so as to attract the member 16 which is fastened to the shaft 15 and causes rotation of the lens plate L through 180 degrees to expose the opposite side of the lens to the evaporators.

I claim as my invention:

1. In a vacuum evaporating device for producing thin films on the surface of an object, in combination, a holder for said object, three elongated evaporating elements equidistant from and in opposed relation to said holder and arranged symmetrically along the sides of an equilateral triangle, a foraminous screen in the form of an equilateral triangle placed between the evaporating elements and said holder for procuring uniform thickness of the evaporated material over the whole surface of said object, said evaporating elements being at an angle to the sides of said screen, the position and size of said screen being so selected that said evaporating elements are just covered by said screen when viewed from the center of said holder on the common axis of said holder, screen and evaporator assembly.

2. In a vacuum evaporating apparatus for producing thin films on the surface of an object, a container adapted to be evacuated, a plurality of elongated evaporating means arranged symmetrically along the sides of an equilateral triangle, means for holding objects to be coated with one side exposed to and substantially equidistant from said evaporating means, means pivotally mounting said holding means, magnetic means connected to said holding means whereby the position of said holding means may be changed to thereby alternately expose opposite sides of said objects to said evaporating means, and a foraminous screen in the form of an equilateral triangle mounted between said evaporating elements and said holding means and positioned in such a manner that said evaporating elements are at an angle to the sides of said screen and so that said screen just covers said elements when viewed from the center of said holding means.

3. In a vacuum evaporating apparatus for depositing a thin film on the surface of one or more objects, a container adapted to be evacuated, three elongated evaporating boats lying in a plane and arranged symmetrically along the sides of an equilateral triangle, a holder for said objects adapted to expose the surfaces to be treated to said evaporators and hold them in a plane parallel to the plane of said boats and spaced therefrom; a foraminous screen having the form of an equilateral triangle, positioned between said boats and said holder, parallel to the plane of said boats, oriented so that said boats lie symmetrically across the corners of the projection of said screen on the plane of said boats and at such a distance from said holder that said screen just covers said boats when viewed from the point of intersection of the plane of said objects and an axis perpendicular to the plane of said boats and passing through the center of said screen.

GLENN L. DIMMICK.